United States Patent
Monteyne

(10) Patent No.: US 6,419,724 B1
(45) Date of Patent: Jul. 16, 2002

(54) METHOD FOR REDUCING IRON OXIDES AND FOR MELTING IRON AND INSTALLATIONS THEREFOR

(75) Inventor: Guido Monteyne, Lembeke (BE)

(73) Assignee: Sidmar N.V., Gent (BE)

( * ) Notice: Subject to any disclaimer, the term of this patent is extended or adjusted under 35 U.S.C. 154(b) by 3 days.

(21) Appl. No.: 09/586,765

(22) Filed: Jun. 5, 2000

Related U.S. Application Data

(63) Continuation of application No. PCT/EP98/07550, filed on Nov. 20, 1998.

(51) Int. Cl.[7] ............................................. C21B 11/06
(52) U.S. Cl. ......................... 75/476; 266/44; 266/168; 266/171
(58) Field of Search ................. 266/168, 169, 266/171, 44; 75/382, 476

(56) References Cited

U.S. PATENT DOCUMENTS

| | | | |
|---|---|---|---|
| 4,032,121 A | * | 6/1977 | Stift et al. .................. 266/163 |
| 5,542,963 A | | 8/1996 | Sherwood |

FOREIGN PATENT DOCUMENTS

| | | |
|---|---|---|
| DE | 2 133860 | 1/1972 |
| EP | 0 094 707 | 11/1983 |
| FR | 1.297.920 | 11/1962 |
| FR | 1.504.346 | 10/1967 |
| FR | 2.262.114 | 9/1975 |
| GB | 1143527 | 2/1969 |
| GB | 1213641 | 11/1970 |

OTHER PUBLICATIONS

*International Search Report (PCT/EP98/07550)—4/99.
*PCT International Preliminary Examination Report with English translation Mar. 2000.

* cited by examiner

*Primary Examiner*—Scott Kastler
(74) *Attorney, Agent, or Firm*—Oblon, Spivak, McClelland, Maier & Neustadt, P.C.

(57) ABSTRACT

An apparatus for producing liquid pig iron, including an iron oxide reducing furnace, a melting furnace positioned to receive and melt iron oxides reduced in the reducing furnace, a pig iron discharge device associated with the melting furnace, a slag discharge device associated with the melting furnace, at least one supply pipe connecting the reducing furnace and the melting furnace such that a mixture of metallized iron from the reducing furnace may be transferred to the melting furnace under gravity, and at least one discharge pipe connected to discharge combustion gases from the melting furnace to the reducing furnace, wherein the at least one supply pipe is provided with a plurality of regulating flap valves configured to allow sufficiently large accumulation of a mass of the mixture of metallized iron and to pour the mixture of metallized iron from a certain height such that the mixture of metallized iron being poured penetrates the pig iron in a molten phase forcefully.

20 Claims, 7 Drawing Sheets

METHOD FOR REDUCING IRON OXIDES AND FOR MELTING IRON AND INSTALLATIONS THEREFOR

CROSS-REFERENCE TO RELATED APPLICATIONS

The present application claims priority under 35 U.S.C. §119 to European Application Nos. EP 97 870 196.9, filed Dec. 3, 1997, EP 98 870 023.3, filed Feb. 2, 1998, EP 98 870 047.2, filed Mar. 6, 1998. The contents of those applications are incorporated herein by reference in their entirety. This application is also a continuation of PCT/EP98/07550, filed on Nov. 20, 1998.

BACKGROUND OF THE INVENTION

1. Field of the invention

The present invention relates to a new method for reducing iron oxides associated with the production of a liquid phase of pig iron, making it possible to produce the metal in the molten state starting with iron oxides, such as ores or recycled products, and with coal and/or gas. The invention aims to achieve several economic advantages described hereinafter and others in comparison with known methods.

The present invention also relates to installations enabling this method to be carried out.

2. Description of the background

The growth in the production of steel by electrical means has increased the need for alternative methods that make it possible to avoid the use of scrap, since scrap of adequate quality is becoming increasingly scarce.

Similarly, the competition between producers and the stagnation in sale price, together with growing ecological pressures, are encouraging steel manufacturers to develop new production methods that are less costly and less polluting.

Various methods for the reduction of iron oxide to produce what is known as direct reduced iron (DRI) have recently been developed for this purpose. DRIs are mainly obtained, for example, by gaseous reduction (HYL process, Midrex) or by reduction from carbonaceous sources as in the SL-RN, Fastmet, Inmetco or Circofer and Comet methods or by the method according to the European patent application filed by the applicant on Jan. 28, 1998 under the number 98200242.0. The majority of these methods have as a major disadvantage the fact that what is obtained is a product in the reduced state, generally described as iron sponges, of very low density and with a high specific surface area promoting a re-oxidation of the iron. This causes difficulties in storage and transport and, in most cases, makes expensive compaction necessary to allow subsequent treatment. As an example, iron sponges generally have a bulk density of 1.5 to 2 $kg/dm^3$ and are compacted up to a value of 5 to 5.5 $kg/dm^3$.

In addition, the large amount of latent heat that is present in the reduced material before cooling is lost.

Some of the proposed reduction methods are based on the use of solid carbonaceous sources, like coal, which are added in excess amounts in order to ensure sufficient reduction. This excess of carbonaceous sources is added to other residual products containing ash that must be disposed of.

All these disadvantages can be avoided by a method for reducing and melting in stages according to the present invention. The crude pig iron produced in the molten phase may be used in all normal applications such as casting in small ingots or the refining operations in steel production, for example, in electric steel plants or in oxygen converters.

The British patent GB 1,143,527 describes a two-stage method for reducing pig iron in which iron ore is reduced in a first furnace and is transferred under gravity while hot directly into a melting furnace. The pre-reduced pieces of iron or "pellets" are propelled with such a speed that they pass through the layer of slag lying on the bath of molten pig iron. This speed is acquired by dropping the pre-reduced pieces of iron or "pellets" through a certain height into the bath. According to a particular embodiment, the pre-reduced pieces of iron or "pellets" are deposited on an inclined platform and are periodically propelled by means of a piston into a pipe in which they are accelerated sufficiently by gravitational forces to pass through the layer of slag formed on the bath of molten steel in the melting furnace. The gases from the melting furnace are led into the reducing furnace through the pipe supplying the melting furnace with reduced iron.

The U.S. Pat. No. 5,542,963 describes an installation for the two-stage production of pig iron in which the iron ore is reduced in a first furnace and is transferred under gravity while hot directly into a melting furnace. The pre-reduced pieces of iron or "pellets" are transferred by means of an Archimedean screw into the melting furnace. The gases from the melting furnace are led into the reducing furnace through a pipe separate from the pipe supplying the melting furnace with reduced iron.

One of the objects according to the present invention is to convert the reduced iron oxides directly and continuously after their production. In order to obtain the pig iron in a liquid state that are economically more advantageous and with technological equipment that is improved and more compact than existing equipment.

In particular, one of the objects according to the present invention is a continuous production of a pig iron, preferably desulphurised and separate from the slag, having a lower and more economic energy consumption through the choice of fuel and through a recovery of energy by direct recycling of the combustion gases in the installation upstream.

An apparatus for producing liquid pig iron includes a reducing furnace for reducing iron oxides and a melting furnace containing a molten phase of pig iron and slag for melting the reduced iron oxides, and units for discharging the pig iron to a pig iron refining plant and units for discharging the slag to a slag treatment plant, wherein the reducing furnace and the melting furnace are connected through one or more pipes supplying the melting furnace with a mixture of metallized iron originating from the reducing furnace by gravity transfer and one or more pipes for the discharge of combustion gases from the melting furnace to the reducing furnace, and the supply pipe or pipes are provided with regulating flap valves that make it possible to accumulate a mass of metallized mixture sufficiently large, after falling through a certain height, to penetrate the liquid pig iron forcefully after it has been poured.

A method for reducing iron oxide and melting iron according to the present invention includes at least two consecutive stages, the first of which is a standard stage of reduction until a degree of metallization is achieved of the order of 80 to 94%, and preferably of 85 to 90%, with the addition of fluxes for grading the slag to be produced in the second stage. The second stage is one that produces the pig iron and follows immediately after the first stage.

The second stage in the production of the pig iron is performed in two successive sub-stages. Firstly, the iron oxide is further reduced by virtually 100%. This may be achieved using a compact reactor with a core allowing the passage of gas or with an injection lance, and with a supply of preheated coal from above, the mixture of almost completely metallized iron, gang, fluxes and surplus coal being immediately transferred directly into a furnace containing a molten phase of pig iron, the metal and the slag then being discharged, preferably continuously, for example by overflowing.

The reduced iron oxides from the first reduction stage may result from any reduction method that may be carried out in, amongst other types of plant, a rotating-hearth furnace, a shaft furnace, a rotary furnace or a fluidized bed furnace. The implementation of the invention becomes more worthwhile economically as the temperature of the reduced product increases, i.e. contains more latent heat.

According to a first embodiment of the present invention, the energy required for the melting may be supplied by induction or possibly by means of an electric arc, a submerged arc, for example.

According to a second embodiment of the present invention, it is also possible to carry out further reduction and continuous melting in a single installation including a unit for feeding the material to be treated. Preferably, the material originates directly from the first stage at a temperature as high as possible. This feed unit emerges into one end of a rotary tubular furnace whose opposite end is open and is connected firstly to a unit, preferably funnel-shaped, for discharging the pig iron and slag, and secondly to a gas discharge unit. A burner located alongside the feed unit provides the heat required for the melting of the material to be treated, while an injection lance, located at the other end of the furnace, desulphurised the bath. The burner may be located on the same side as the discharge units or may even be duplicated if this is demanded by the way the melting is to be performed.

In this case, the aforesaid constituent elements of the installation are preferably mounted on a common chassis in such a way that the whole assembly may be tilted. Conventionally, the furnace is preferably mounted on rings resting on rollers driven by motors and by a suitable transmission system.

The inclination of the chassis that supports, amongst other things, the rotary furnace may be controlled so as to produce a continuous tilting movement of the furnace, the effect of which is intermittently to take the hot pig iron coming from the discharge end of the furnace to its feed end and consequently to cause a pulsed flow of the pig iron to the outlet, a movement that is no longer continuous but is discontinuous or, even better, pulsed. This ensures better melting of the charge by taking a hot molten mass from the discharge outlet, the said mass being mixed with the cooler liquid bath located at the feed end. At the same time, this produces a homogenization of the carbon concentration, which increases during the movement from the feed end to the discharge end.

The homogenization increases the melting capacity and the reducing capacity, thus improving the properties of the molten bath. The increase in carbon concentration lowers the temperature at which the pig iron solidifies, which also has a highly beneficial effect on the progress of the process.

The general configuration of the furnace is also an important factor influencing the melting of the iron sponge. It is clear that an inner diameter larger at the feed end than that at the discharge end is particularly effective here, especially in combination with the effect of aforesaid tilting, by increasing the volume of pig iron, by increasing the pumping effect and lastly by increasing the melting capacity.

The essential characteristic of the invention is that all the transfers from the DRI production unit to the stage in which the pig iron is produced are achieved under the effect of gravity, with care being taken to reduce heat losses.

It should be noted that a method according to the present invention differs essentially from the methods used in the present state of the art by the fact that, firstly, an almost complete reduction of the iron oxides involved is achieved and, secondly, that the resultant materials flow directly to a bath consisting of a liquid phase of pig iron, without interruption and, above all, without appreciable cooling between the stages.

Care is taken to see that the liquid pig iron produced has a precisely determined carbon concentration above 3%, preferably in the order of 4.5 to 5.5%, which in general, for the majority of iron ores involved, makes it possible to obtain a molten pig iron with a satisfactory fluidity.

Other details relating to a method according to the present invention will be described in more detail hereinafter.

According to the aforesaid first embodiment, the method is carried out in such a way that the gas produced in the underlying furnace is fed directly through a gas discharge pipe to the first stage in order to make its contribution through its latent heat and its reducing capacity.

In the pipe supplying the metallized mixture originating from the first stage, a regulating flap valve makes it possible, as the metallized mixture is discharged, to create a buffer zone with enough weight and sufficient drop height, during its pouring, to penetrate the liquid surface in the underlying furnace forcefully, which considerably accelerates the melting.

This underlying melting furnace is provided with equipment for the intermittent discharge of the liquid pig iron, preferably, for simplicity, in the form of a trap in which the pig iron and the slag are separated in a way known per se. The slag is preferably granulated or may coagulate in basins provided for this purpose. The two forms of slag are known marketable by-products. The crude pig iron in the liquid state forms a particularly useful product, for example in refining processes such as those using electric furnaces (RAFs) or oxygen converters (BOFs).

Although the method has been described for the reduction of iron oxides, it may however also be applied to the reduction of other metallic oxides or mixtures of them with iron oxides, particularly the metals used together with iron for the production of alloys such as stainless steel. It also applies to the recovery of dust from blast furnaces, converters and electric furnaces.

A method according to the present invention in two successive stages with movement under gravity also makes it possible to treat recyclable by-products originating from iron and steel plants.

The pig iron produced may be used directly in the molten state but also in the form of ingots.

The almost complete absence of iron oxides at the end of the second stage guarantees a prolonged working life for the refractory lining of the outlet from the reactor and for the induction furnace.

A method according to the present invention is characterized by a very high productivity in the steel production process, because the starting materials used are in the liquid state instead of the solid state of the materials produced particularly in the DRI method.

The choice of the DRI method for the first stage is guided by consideration of the best economic conditions, given the local circumstances, for coupling to the second stage of the method.

The method also has several advantages purely from the point of view of the energy required.

Continuous casting in both stages avoids any energy loss. Moreover, the useful gases released by the second stage may be reused. The surplus fuel (coal) from the first stage may be used advantageously in the second stage. The surplus coal shares the feed pipe at the final reduction of the non-reduced iron oxides; the surplus coal in the second stage plays a part in the grading of the pig iron.

The feed pipes connecting the first and second stages make it possible to construct an installation with a particularly compact shape, which also reduces the capital cost. The melting unit of the second stage has a considerably smaller bulk.

Finally, the method makes possible the optimum use of recycled materials.

From the qualitative point of view, it should be noted that the pig iron forms a much more stable (no re-oxidation) and advantageous raw material than scrap, which involves major qualitative problems because of the impurities present. The pig iron contains an additional energy source in the form of the carbon present. The desulphurisation is carried out as for the pig iron from a blast furnace.

As has been indicated, it is also possible, according to a second embodiment according to the present invention, to carry out the two sub-stages forming the second stage of the invention in a single installation.

Advantageously, in this case, the feed unit of this installation includes a feed chute or any other suitable supply system such as an Archimedean screw, which is mounted on a disc into which the universal burner also emerges. A pulverized coal injector may also be mounted on this disc in order firstly to avoid a re-oxidation of the charge and secondly to achieve the final reduction of the iron sponge and to add to the bath the coal necessary to obtain a high quality pig iron.

This disc is fixed and connected to one end of the rotary furnace, by means of doubly sealed joints mounted on an expansion joint for example, the intermediate chamber of the joint being preferably capable of pressurization by an inert gas, preferably nitrogen, the whole assembly allowing relative movement between the fixed disc and the rotary furnace and taking up the thermal expansion.

Similarly, at the other end of the rotary furnace, similar devices take up the expansion and allow the rotation of the opposite end of the furnace with respect to the unit for the discharge of the pig iron and the slag.

The feed unit is itself connected to a pipe or a chute connected to the DRI production unit of the first stage. The fulcrum of the chassis, used for adjusting the inclination of the rotation axis of the melting furnace, is ideally located at the center of the connecting surface of the feed pipe. This arrangement makes it possible to adjust the flow rate of the pig iron to be discharged or even to interrupt its pouring, for example to change the device for discharging the liquid pig iron.

Advantageously, a flap valve, preferably a double flap valve, allowing the passage of solid materials but preventing a gaseous reflux to the DRI production furnace, may be provided, preferably upstream from the aforesaid rotation point.

In the same way, the gas discharge unit is connected to an external fixed pipe by the same type of expansion joint as above.

The whole of the installation is of course provided with a refractory lining.

Other details and characteristics of the invention will appear on reading the following description of preferred embodiments according to the present invention.

The pig iron produced may be used for the initial production of steel, for example with electric furnaces or BOF-type converters, with the aim of reducing the time taken for their production cycle compared with DRI charging cycles.

The invention embodies a constructive design that is simple, compact and cheap.

It also uses energy sources, such as natural gas, coke oven gas and/or pulverized coal as well as fuels originating from recycled waste with high calorific values such as oils, plastics, etc., that have been prepared for this purpose, which are cheaper than those used in conventional electric furnaces, particularly induction or arc furnaces.

The installation according to the present invention further aims to obtain an increased working life for the refractory lining, because the typical phenomena of erosion and chemical attack appearing at the level of the slag, in an electric furnace for example, are avoided due to the agitation and, more particularly in the second embodiment according to the present invention, due to the continuous rotation of the melting furnace about its horizontal rotation axis.

It is also possible to avoid using a separate dust-extractor plant and to achieve an almost complete recovery of the latent heat from the fuel gases in installations located upstream from the melting furnace.

Because of the specific design of the elements constituting the installation, a unit requiring a renewal of the lining can be simply replaced by a spare unit without appreciable interruption in production.

The equipment of the casting zone is particularly simple and reliable, no plugging or drilling machine for the cast;ng being necessary as it is for the casting floor of a blast furnace.

The invention thus provides an economic method for producing pig iron, both as regards the capital cost and the running expenses, a method that remains profitable even for small units producing only 250 kt annually, for example.

In general, it is possible to envisage operating with a smaller staff, because the installation and its use are both simple and reliable; similarly, the level of risk, and hence the accident rate, is very much smaller than that of known installations.

The method produces a slag with properties close to that from blast furnaces, easily capable of being commercially exploited, which is not the case for slag produced by direct DRI charging in a steel production process.

SUMMARY OF THE INVENTION

An object of the present invention is to convert the reduced iron oxides directly and continuously.

Another object of the present invention is to obtain pig iron in a liquid state that are economically more advantageous.

Still another object of the present invention is to provide an improved and more compact technological equipment for producing pig iron than existing equipments.

These objects and others can be achieved according to the present invention by providing an apparatus including an iron oxide reducing furnace, a melting furnace positioned to receive and melt iron oxides reduced in the reducing furnace, a pig iron discharge device associated with the melting furnace, a slag discharge device associated with the melting furnace, at least one supply pipe connecting the reducing furnace and the melting furnace such that a mixture of metallized iron from the reducing furnace may be transferred to the melting furnace under gravity, and at least one discharge pipe connected to discharge combustion gases from the melting furnace to the reducing furnace, wherein the at least one supply pipe is provided with a plurality of regulating flap valves configured to allow sufficiently large accumulation of a mass of the mixture of metallized iron and to pour the mixture of metallized iron from a certain height such that the mixture of metallized iron being poured penetrates the pig iron in a molten phase forcefully.

These objects and others can also be achieved according to the present invention by providing an apparatus for producing liquid pig iron, including an iron oxide reducing furnace, a melting furnace positioned to receive and melt iron oxides reduced in the reducing furnace, at least one supply pipe connecting the reducing furnace and the melting furnace such that a mixture of metallized iron may be transferred from the reducing furnace to the melting furnace, and at least one regulating flap valve provided in the at least one supply pipe, the at least one regulating flap valve being configured to allow sufficiently large accumulation of a mass of the mixture of metallized iron and to pour the mixture of metallized iron such that the mixture of metallized iron sufficiently penetrates the pig iron in a molten phase.

These objects and others can also be achieved according to the present invention by a method for producing liquid pig iron, including reducing iron oxides, accumulating the iron oxides into a sufficiently large mass, pouring the sufficiently large mass of the iron oxides into a melting furnace such that the sufficiently large mass of the iron oxides penetrate liquid pig iron in the melting furnace forcefully, and melting the iron oxides in the liquid pig iron in the melting furnace.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
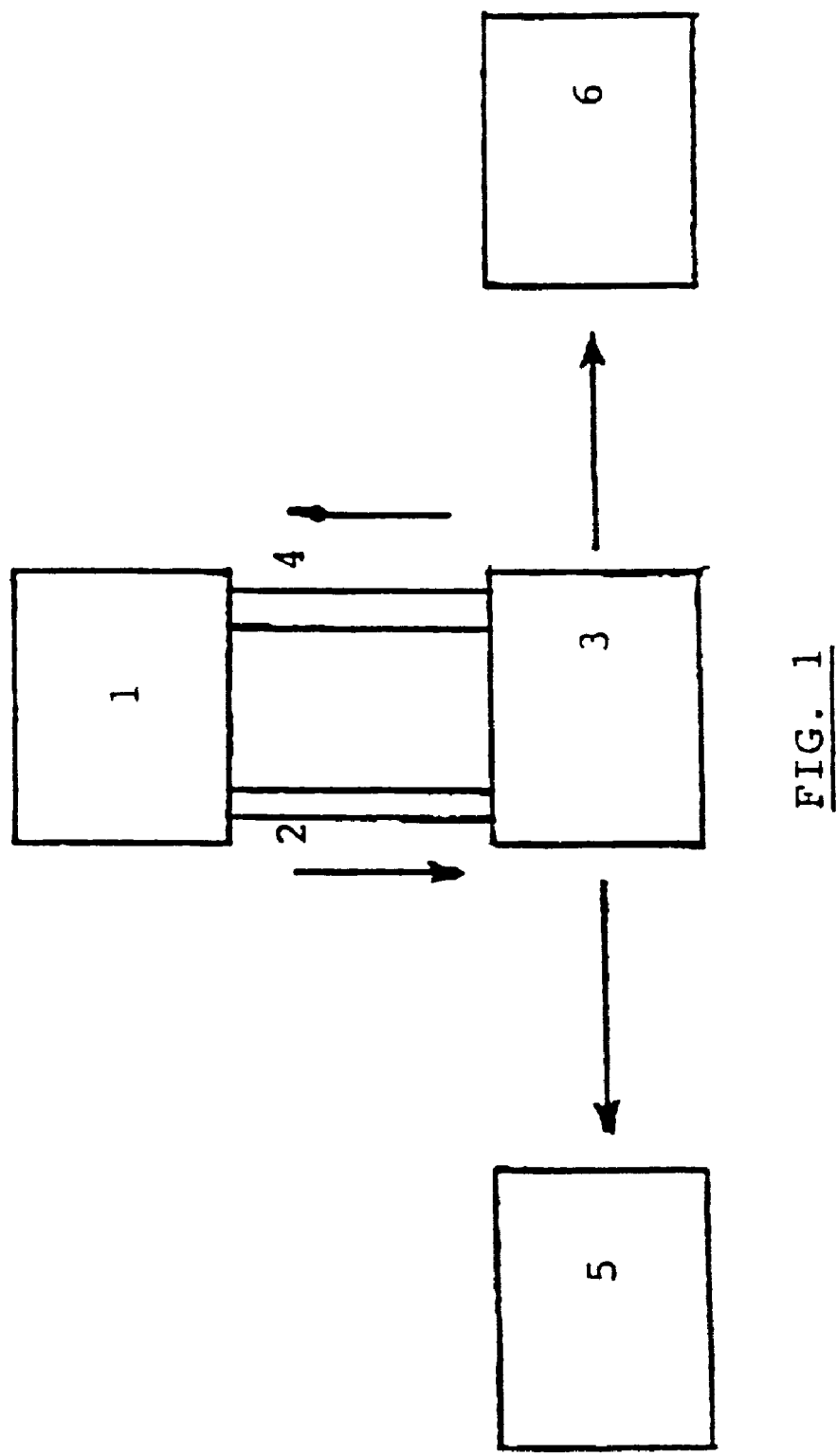
FIG. 1 is a block diagram of an installation for the implementation of the method.
Figure 2:
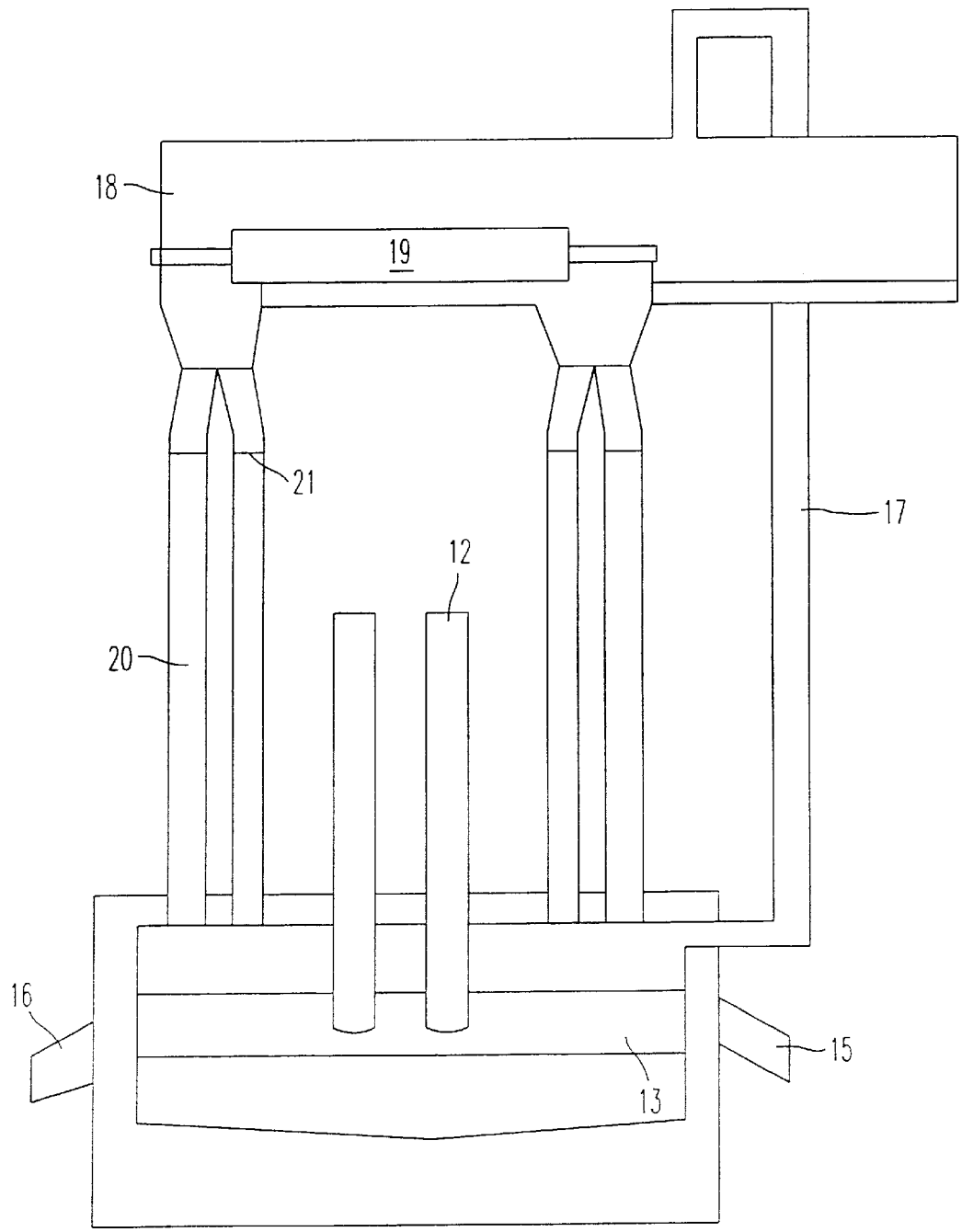
FIG. 2 is an installation with feed pipes, a gas discharge pipe and submerged-arc furnace according to the first variant of the invention.

The preferred embodiments will now be described with reference to the accompanying drawings, wherein like reference numerals designate corresponding or identical elements throughout the various drawings.

Provision is made, after a first standard stage of DRI production 1, for transferring the metallized mixture (DRI) through a pipe 2 for feeding the melting furnace 3. The combustion gases from the melting furnace are discharged through a pipe 4 to the DRI furnace, while the pig iron is discharged to a refining plant 5 and the slag is discharged to a slag treatment plant 6.

An installation according to the present invention includes an iron oxide reducing furnace 18, by a DRI feed pipes 20 and by a submerged-arc electric melting furnace, in which the first stage, the DRI charging and its melting take place, and by a gas discharge pipe 17.

The DRI, at a temperature above 1000° C., mixed with surplus coal, with lime and other agents, is discharged from a hearth 19 into one of a four discharge pipes 20. A flow-regulating flap valve 21 intermittently releases the metallized mixture, which passes through the slag and penetrates the molten pig iron. Electrodes 12 of the melting furnace dip into the slag 13 in which the electric arc is formed. The pig iron produced is discharged through a chute 16, the slag is discharged through the chute 15 and the combustion gases are discharged through the gas discharging pipe 17 and are reinjected into the reducing furnace 18.

The molten pig iron may be used for any conventional application.

The slag may be subjected to granulation and may be used in the normal applications of slag, particularly of blast-furnace slag.

In FIGS. 3 to 9, a second embodiment according to the present invention is described. The following reference numbers have been used.

Figure 3:
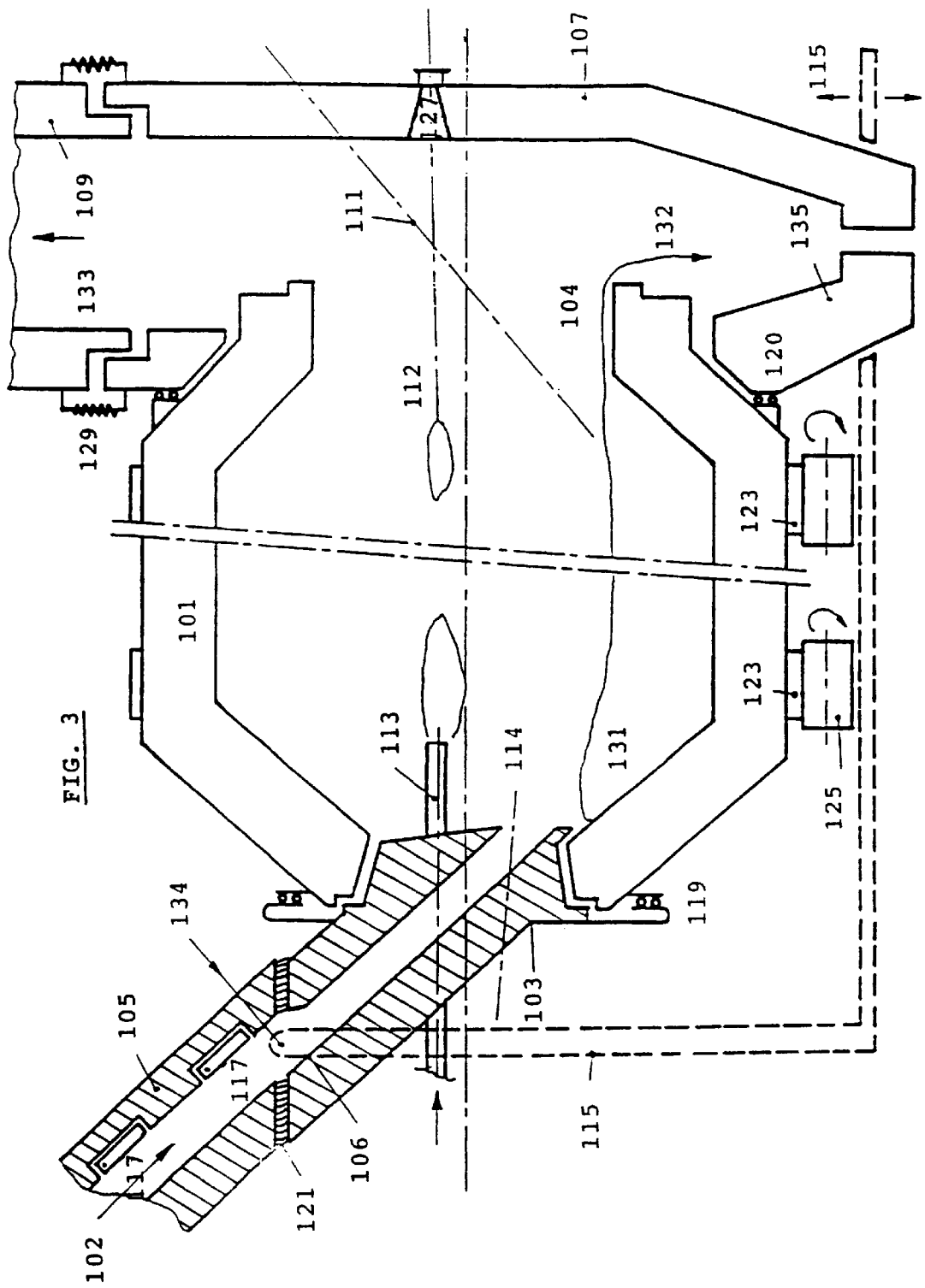
FIG. 3 is a diagrammatic cross-section through an installation according to the second variant of the invention, with its connection to a DRI feed chute and its connection to the equipment for the discharge of the treated material and to the gas discharge installation.

An installation represented in FIG. 3 includes firstly of a rotary furnace 101 provided at one end (the upstream end taking into account the direction in which the materials move) with a unit 103 for feeding in DRI 102 and at the other end (downstream) with an opening 104 connected to a unit 107 for discharging the liquid pig iron and the slag and to a gas discharge unit 109.

Figure 4:
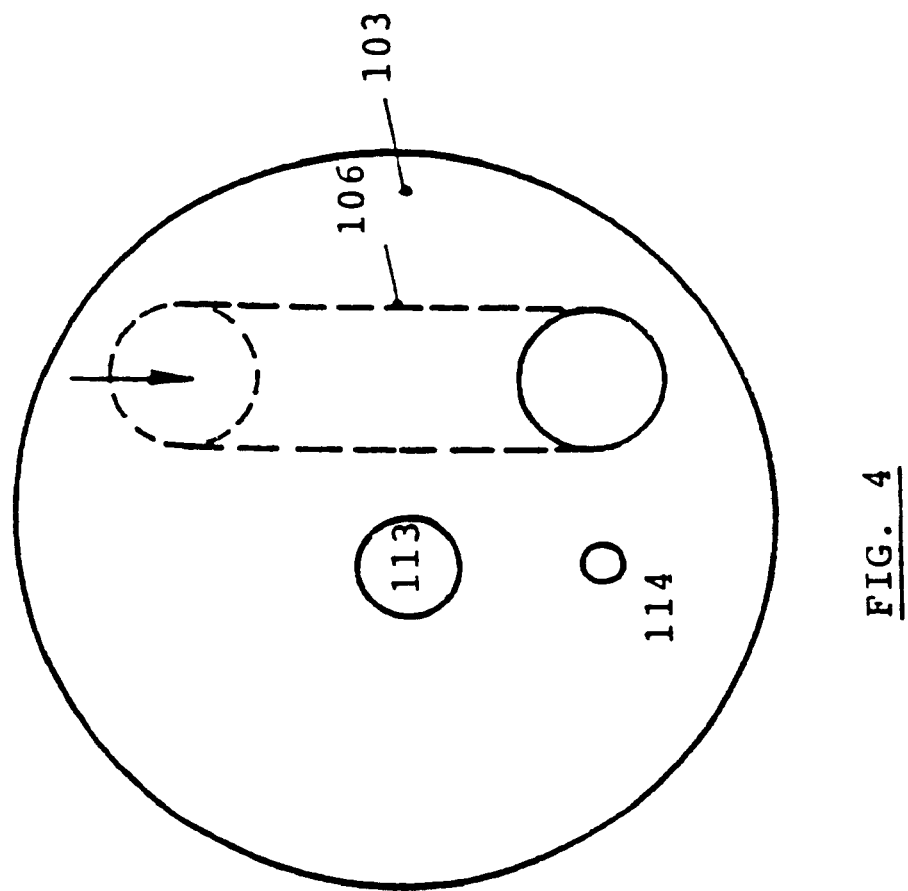
FIG. 4 is a view of the fixed disc mounted on the feed end of the rotary furnace.

FIG. 4 represents a feed unit 103 including, amongst other things, a disc 103, forming a buffer, provided with an inclined feed chute 106. Through the same disc, a burner 113 emerges into a furnace. The length of the burner penetrating the furnace is adjustable in order to optimize the melting of the mass of DRI 131 at the entrance to the furnace 101. This burner may be mounted on the opposite side, and may also be duplicated by arranging a burner on each side. The disc 103 may also be provided with a pulverized coal injector 114. A peripheral sealing joint 119 allows the furnace 101 to rotate with respect to the fixed disc.

The other end of the furnace is open and emerges firstly towards a unit 135 and secondly towards a unit 109.

Appropriate joints 120 are again provided to allow the furnace 101 to rotate.

The assembly including the furnace 101 and the units 103, 107 and 135 (or 137) is carried by a chassis 115. Rollers 125 supporting the rotary furnace 101 are mounted on this chassis. This furnace 101 is itself provided with rings 123 resting on the rollers 125. The rollers 125 are driven directly or indirectly by a motor (not represented).

The ends of the chute 106 are connected to a pipe 105 by a compressible element 121.

The chassis 115 as a whole, with the rotating equipment 101 and fixed equipment 103, 107 and 135 (or 137) that it supports, may be inclined to the horizontal about a fulcrum 134 located at the same level as this connection.

Two working situations are described hereinafter.

In the first situation, the furnace is in production, its rotation axis being slightly inclined.

In this case, because of the compressibility of a joint 121 in the chute 106 and the pipe 105, the imperviousness of their link is maintained during the rotation.

Because of the length of the rotary furnace 101, even a small inclination may produce a vertical displacement of the downstream end of the furnace in the order of 10 to 20 cm.

The gas discharge unit 107 is connected to a recycling pipe 109 supplying the DRI furnace by an expansion joint 129, which also provides an impervious seal.

A second working situation is one in which the furnace has to undergo a substantial overhaul.

In this case, the chute 106 only has to be detached from the pipe 105 in order to move the chassis with the integrated unit. The installation may also be dismantled by detaching the furnace 101 from the unit 103 at one end and from the units 107 and 135 (or 137) at the other end (with dismantling, of course, of the various expansion joints and other joints).

Thus, if a complete overhaul of the refractory lining of the furnace 101 is required, it is possible to fix it vertically, for example, with suitable handling means provided for this purpose.

In practice, the installation of the invention is designed so that it can be dismantled and replaced by a complete spare installation quickly, or partially dismantled and replaced by one of its constitutive elements.

It is, for example, possible to disconnect the DRI feed installation of the furnace quickly and to replace it with a preheated spare installation.

Various items of equipment may be provided in the installation.

Both the furnace 101 and the units 103, 5 107, 109 and 135 (or 137) are provided with an adequate refractory lining capable of withstanding the temperatures and the charge.

Figure 5:
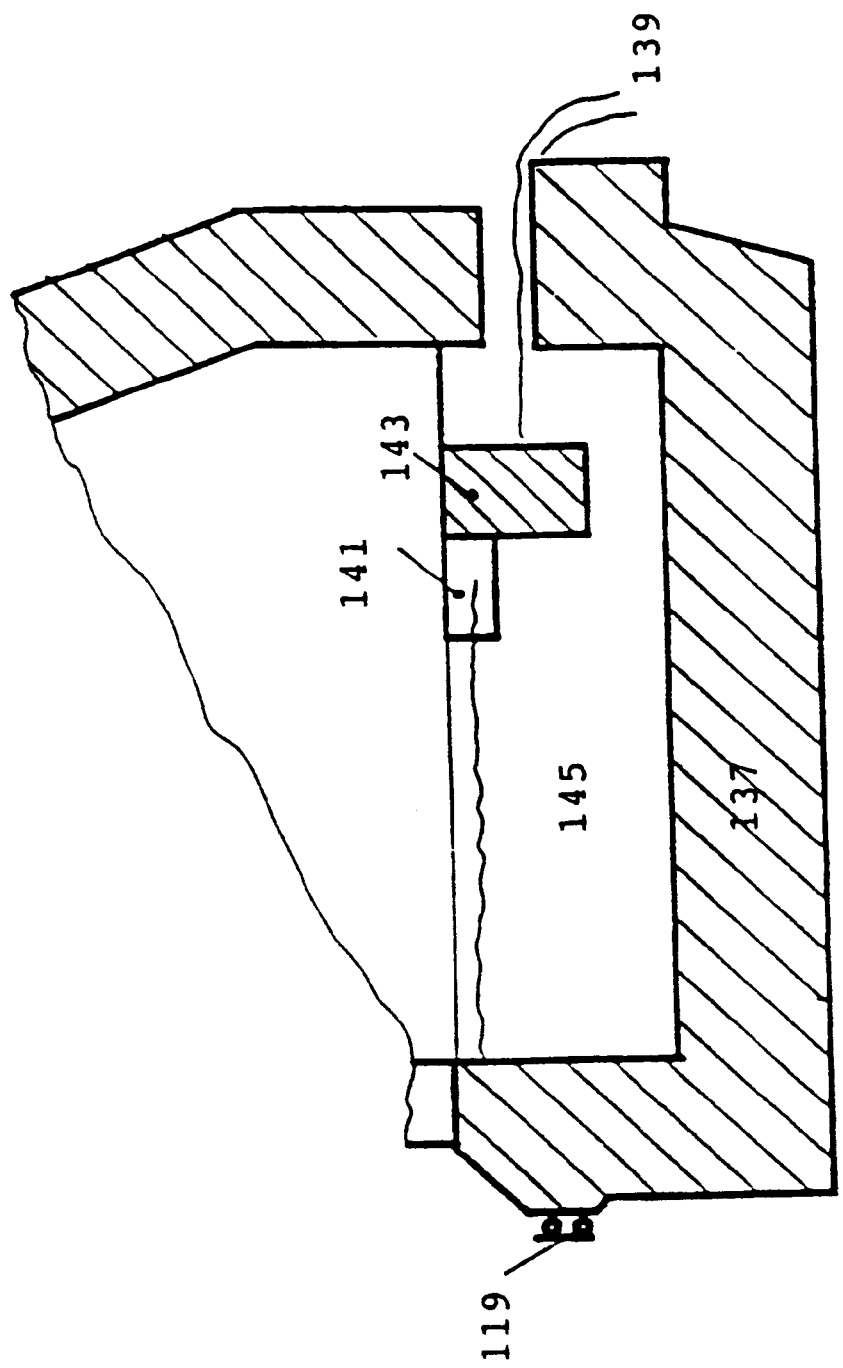
FIG. 5 is a view of a device for separating the liquid pig iron and the slag, with a sealing joint allowing the rotation of the furnace with respect to the non-rotating elements of the invention.

The liquid pig iron discharge unit, which preferably has the shape of a funnel 135 as represented in FIG. 3, may be provided with a trap 137 as represented, for example, in FIG. 5.

Similarly, an observation window 127, for example, may be provided in the wall facing the opening 104.

In this wall, it is also possible to provide a desulphurisation lance 111 and an oxygen lance located in the upper part at the edge of the opening 104 to clear away any deposits of pig iron and slag that might be formed at this point.

The geometry of the disc 103 and that of the lining of the furnace 101 at the point where they are joined together are chosen so as to ensure the best possible functioning of the installation.

Because of the inclination of the furnace and, of course, of its shape as represented, it is necessary to maintain a bath of molten material 131 while ensuring a progressive displacement of this material (from left to right in FIG. 3). The fed-in material to be treated is in general lighter than the material in the bath and partially floats on its surface.

It should be pointed out that the material to be treated, as well as being melted, undergoes a final reduction in the furnace and a carburization until a 4% carbon content is achieved through the injection of pulverized coal.

The heat required for the melting is provided mainly by radiation from the burner flame above the charge and by that from the walls of the furnace. In addition, the hot refractory lining of the rotary furnace heats the bath by direct contact.

Unlike melting reactors and electric furnaces, in which rapid wear of the lining due to the slag is generally observed and results in local wear, no effects of local wear are observed in the installation according to the present invention and this contributes greatly to its longevity.

The burner mounted on the disc 103 may advantageously be moved longitudinally with respect to the rotation axis of the furnace for adjustments that, in particular, make it possible to avoid re-oxidation of the feed material. The same thing applies to the burner 112 possibly located on the discharge side.

Advantageously, a double non-return flap valve 117 is provided for the gases, preferably in the feed pipe 105, which nevertheless allows the passage of the solid materials fed into the furnace. The non-return flap valve 117 is intended to prevent the flow of combustion gases from the burner-being reversed.

Figure 6:
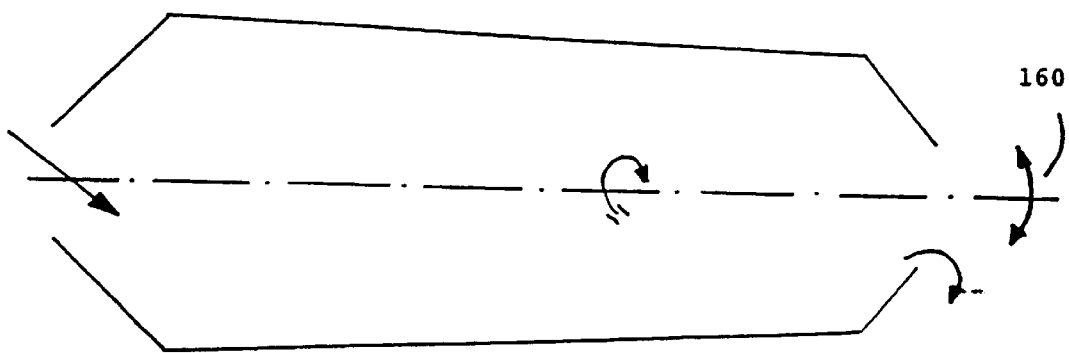
FIG. 6 is a diagrammatic view of a first form with a conical narrowing in the furnace from upstream to downstream.
Figure 7:
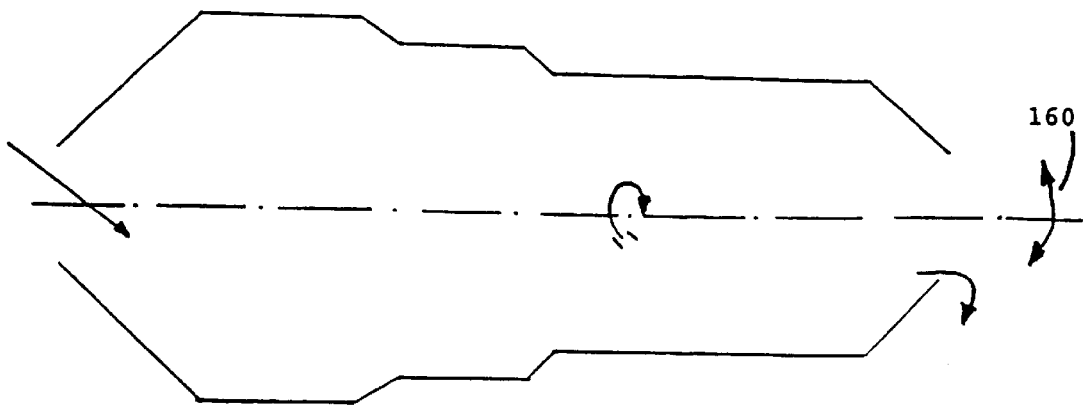
FIG. 7 is a diagrammatic view of a second form with a stepped narrowing from upstream to downstream.
Figure 8:
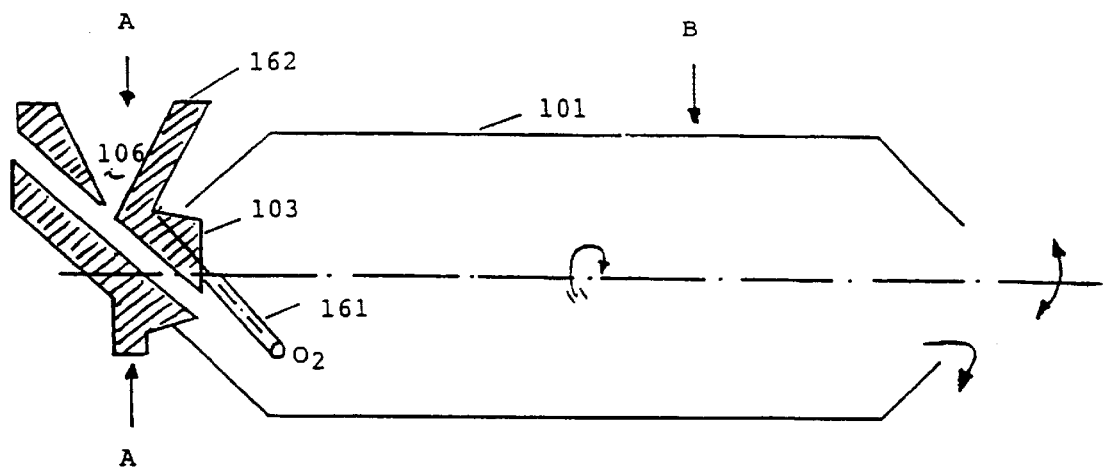
FIG. 8 is a diagrammatic view of certain additional equipment in a rotary furnace itself shown in longitudinal cross-section.
Figure 9:
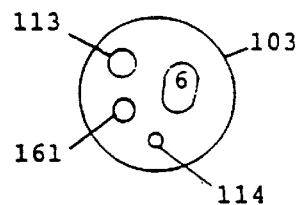
FIG. 9 is a section through A—A at the feed end.

FIGS. 6 and 7 illustrate two forms of an installation equivalent to the installation 101. In the case of FIG. 6, the shape is tapered towards the outlet. In the case of FIG. 7, the shape has "steps" from one end to the other.

As has been indicated, it is advantageous that the furnace has a diameter at the feed end greater than the diameter at the discharge end.

In addition, as arrows 160 illustrate, the furnace may undergo a tilting motion.

The generally disc-shaped feed unit indicated by reference number 103 may be provided (as already mentioned in previous applications) with a device 114 for injecting pulverized coal, with an oxygen lance which, preferably, dips into the molten mass and with a burner 113. It also appears advantageous to provide, through the feed chute 106 or through an additional pipe, for recycling part of the pig iron produced, for example by means of a trap 162.

Illustrated in the drawings is a partial separation panel 163 driven by the rotation of the furnace and provided with a central opening 165 and peripheral openings 164. This panel 163 enables the gases to be discharged and the pig iron to be transferred to the discharge end of an upstream compartment but retains the discarded clinker and the foam produced by the vigorous activity in the bath during the injection of oxygen through the oxygen lance 161.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An apparatus for producing liquid pig iron, comprising:
    an iron oxide reducing furnace;
    a melting furnace positioned to receive and melt iron oxides reduced in said reducing furnace;
    a pig iron discharge device associated with said melting furnace;
    a slag discharge device associated with said melting furnace;
    at least one supply pipe connecting said reducing furnace and said melting furnace such that a mixture of metallized iron from said reducing furnace may be transferred to said melting furnace under gravity; and
    at least one discharge pipe connected to discharge combustion gases from said melting furnace to said reducing furnace,
        wherein said at least one supply pipe is provided with a plurality of regulating flap valves configured to allow sufficiently large accumulation of a mass of the mixture of metallized iron and to pour the mixture of metallized iron from a certain height such that the mixture of metallized iron being poured penetrates the pig iron in a molten phase forcefully.

2. The apparatus of claim 1, wherein said melting furnace comprises an induction furnace.

3. The apparatus of claim 1, wherein said melting furnace comprises an electric arc furnace.

4. The apparatus of claim 3, wherein said electric arc furnace comprises a submerged arc furnace.

5. The apparatus of claim 1, wherein said melting furnace including:
a rotary tubular furnace;
a feed unit communicating to said rotary tubular furnace at one end portion of said rotary tubular furnace to supply a material to be treated into said rotary tubular furnace;
a gas discharge unit communicating to said rotary tubular furnace at an opposite end portion of said rotary tubular furnace to discharge the combustion gases from said rotary tubular furnace;
a discharging unit communicating to said rotary tubular furnace at the opposite end portion of said rotary tubular furnace to discharge the liquid pig iron and the slag; and
a combined fuel burner positioned to supply heat required for melting the material to be treated inside said rotary tubular furnace.

6. The apparatus of claim 5, wherein said melting furnace is mounted on a common chassis configured to tilt said rotary tubular furnace without interrupting production of the liquid pig iron and to permit quick exchange of said melting furnace to another melting furnace.

7. The apparatus of claim 6, wherein:
said feed unit is connected to at least one of a pipe and a chute mounted on said reducing furnace by at least one gas-tight expansion joint; and
said common chassis includes a fulcrum located at a level where said feed unit and said at least one of a pipe and a chute are connected, said fulcrum being configured to incline the apparatus.

8. The apparatus of claim 5, wherein the gas discharge unit is configured to take in hot combustion gases and is connected directly to an upstream equipment which supplies the material to be treated to the apparatus.

9. The apparatus of claim 5, wherein said feed unit includes a disc on which said combined fuel burner is disposed and a feed chute mounted on said disc.

10. The apparatus of claim 9, wherein said melting furnace includes a pulverized coal injector disposed on said disc.

11. The apparatus of claim 5, further comprising a plurality of flap valves provided between said reducing and melting furnaces, said plurality of flap valves being configured to allow passage of solid materials while preventing a gaseous reflux.

12. The apparatus of claim 5, wherein said melting furnace includes:
a wall facing a discharge opening of said rotary tubular furnace;
a desulphurization lance provided on said wall; and
an observation window provided on said wall; and
a second burner disposed on said wall and positioned to provide heat inside said rotary tubular furnace.

13. The apparatus of claim 5, wherein said melting furnace has inclination and a shape such that a bath of molten material is maintained while ensuring a progressive movement of the molten material.

14. The apparatus of claim 5, further comprising a tilting chassis configured to allow interruption of continuous casting such that transfer devices are replaced as filled with the liquid pig iron.

15. An apparatus for producing liquid pig iron, comprising:
an iron oxide reducing furnace;
a melting furnace positioned to receive and melt iron oxides reduced in said reducing furnace;
at least one supply pipe connecting said reducing furnace and said melting furnace such that a mixture of metallized iron may be transferred from said reducing furnace to said melting furnace; and
at least one regulating flap valve provided in said at least one supply pipe, said at least one regulating flap valve being configured to allow sufficiently large accumulation of a mass of the mixture of metallized iron and to pour the mixture of metallized iron such that the mixture of metallized iron sufficiently penetrates the pig iron in a molten phase.

16. The apparatus of claim 15, further comprising at least one discharge pipe connected to discharge combustion gases from said melting furnace to said reducing furnace.

17. The apparatus of claim 15, further comprising at least one flap valve provided between said reducing and melting furnaces, said at least one flap valve being configured to allow passage of solid materials while preventing a gaseous reflux.

18. The apparatus of claim 15, wherein said melting furnace including:
a rotary tubular furnace;
a feed unit communicating to said rotary tubular furnace at one end portion of said rotary tubular furnace to supply material to be treated into said rotary tubular furnace;
a gas discharge unit communicating to said rotary tubular furnace at an opposite end portion of said rotary tubular furnace to discharge the combustion gases from said rotary tubular furnace;
a discharging unit communicating to said rotary tubular furnace at the opposite end portion of said rotary tubular furnace to discharge the liquid pig iron and the slag; and
a combined fuel burner positioned to supply heat required for melting the material to be treated inside said rotary tubular furnace.

19. A method for producing liquid pig iron, comprising the steps of:
providing at least one supply pipe connecting a reducing furnace and a melting furnace and having a plurality of regulatory flap valves configured to accumulate a mass of reduced iron oxides from a first reduction stage sufficiently large in the at least one supply pipe at a sufficient height such that the mass of the reduced iron oxides penetrates into liquid pig iron in the melting furnace forcefully when poured into the liquid pig iron in the melting furnace;
reducing iron oxides to produce reduced iron oxides in the reducing furnace;
accumulating the reduced iron oxides from the first reduction stage into the mass sufficiently large at the sufficient height in the at least one supply pipe;
pouring the mass of the reduced iron oxides from the first reduction stage into the melting furnace to penetrate the liquid pig iron in the melting furnace forcefully; and
melting the reduced iron oxides from the first reduction stage in the liquid pig iron in the melting furnace.

20. The method of claim 19, wherein the reduced iron oxides from the first reduction stage are accumulated into the mass and poured into the melting furnace while substantially maintaining a temperature gained in said reducing step.

* * * * *

UNITED STATES PATENT AND TRADEMARK OFFICE
CERTIFICATE OF CORRECTION

PATENT NO. : 6,419,724 B1
DATED : July 16, 2002
INVENTOR(S) : Monteyne

It is certified that error appears in the above-identified patent and that said Letters Patent is hereby corrected as shown below:

<u>Title page,</u>
Insert Foreign Application Data as follows:

-- [30]  Foreign Application Priority Data

Dec. 3, 1997 (EP) …………………………….. 97870196
Feb. 6, 1998 (EP) …………………………….. 98870023
Mar. 6, 1998 (EP) ……………………………... 98870047 --

Signed and Sealed this

Seventh Day of January, 2003

JAMES E. ROGAN
*Director of the United States Patent and Trademark Office*